(12) United States Patent
Kudo et al.

(10) Patent No.: US 6,581,508 B2
(45) Date of Patent: Jun. 24, 2003

(54) LINEAR ACTUATOR WITH SHOCK-ABSORBING MECHANISM

(75) Inventors: Masayuki Kudo, Tsukuba-gun (JP); Hidehito Takahashi, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 49 days.

(21) Appl. No.: 09/998,647

(22) Filed: Dec. 3, 2001

(65) Prior Publication Data

US 2002/0073797 A1 Jun. 20, 2002

(30) Foreign Application Priority Data

Dec. 20, 2000 (JP) ........................................ 2000-386996

(51) Int. Cl.[7] ................................................ F01B 11/02
(52) U.S. Cl. ........................................ 92/85 R; 92/88
(58) Field of Search .................. 92/85 R, 88; 74/89.32, 74/89.33

(56) References Cited

U.S. PATENT DOCUMENTS 5,335,583 A * 8/1994 Kaneko et al. ................ 92/88

6,196,110 B1 * 3/2001 Angue ........................... 92/88

FOREIGN PATENT DOCUMENTS

JP  7-353897  12/1999

* cited by examiner

Primary Examiner—Edward K. Look
Assistant Examiner—Thomas E. Lazo
(74) Attorney, Agent, or Firm—Oblon, Spivak, McClelland, Maier & Neustadt, P.C.

(57) ABSTRACT

A plurality of shock absorbers 14 are disposed in parallel to each other in different positions on the left and right in a slide table 13 with push rods 14a for expanding and contracting projecting outside from opposite end faces of the slide table 13 in a moving direction of the slide table 13 and a plurality of stoppers 15 with which the respective push rods 14a collide at stroke ends of the slide table 13 are disposed in such positions at opposite end portions of the rail base 11 to face the respective shock absorbers 14.

7 Claims, 4 Drawing Sheets

LINEAR ACTUATOR WITH SHOCK-ABSORBING MECHANISM

TECHNICAL FIELD

The present invention relates to a linear actuator with a shock-absorbing mechanism for causing a slide table for carrying a workpiece to linearly reciprocate by a driving mechanism and for stopping the slide table at stroke ends in shock-absorbed manner.

PRIOR ART

Conventionally, in this type of linear actuator with a shock-absorbing mechanism, a guide rail 3 extending in a longitudinal direction and a rodless cylinder 4 in parallel to the guide rail 3 are disposed on a rectangular rail base 1 as shown in FIG. 4. End walls 2 and 2 of a pair disposed on opposite end sides of the guide rail 3 and also functioning as end covers of opposite end portions of the rodless cylinder 4 are provided to longitudinal opposite end portions of the rail base 1. A slide table 5 for carrying a workpiece is provided onto the guide rail 3 to be driven by the rodless cylinder 4 to linearly reciprocate.

Ports 8 for supplying fluid pressure to the rodless cylinder 4 are provided to the end walls 2 and two shock absorbers 6 and 6 are mounted respectively through support blocks 7 to inner sides of the two end walls 2 to face opposite end faces of the slide table 5.

In such a linear actuator, if the fluid pressure is supplied to the rodless cylinder 4, the slide table 5 is driven by the rodless cylinder 4 to move on the guide rail 3, the end face of the slide table 5 collides with a push rod 6a for expanding and contracting of the shock absorber 6 at each stroke end, and the slide table 5 stops in a shock-absorbed manner.

However, in such a prior-art linear actuator, the two shock absorbers 6 and 6 are disposed on the inner sides of the end walls 2 and 2 to project toward the slide table 5 and the slide table 5 reciprocates between the shock absorbers and stops at each the stroke end in a state in which the push rod 6a is contracted. Therefore, a stroke of the slide table 5 is short in spite of a large entire length of the apparatus.

Moreover, it is difficult to discharge dust or the like which has settled on the rail base 1 and the guide rail 3 because of the end walls 2 and 2 and maintainability is poor.

Therefore, there is one disclosed in Japanese Patent No. 3011084 in which stoppers are provided in positions at inward distances from end faces of the slide table under the slide table and a part of the shock absorber enters the slide table at each stroke end of the slide table.

However, because the two shock absorbers and the two stoppers are disposed coaxially in this example, positions of them interfere with each other and a depth of each the space portion where the shock absorber enters cannot be set to be very large depending on a size of the slide table. Therefore, the stroke of the slide table cannot be set to be large in spite of a length of the apparatus. Moreover, because the rail base has end walls at opposite sides of the rail base, the poor maintainability is not improved.

DISCLOSURE OF THE INVENTION

It is an object of the present invention to provide a small-sized linear actuator with a shock-absorbing mechanism in which a plurality of shock absorbers and a plurality of stoppers are disposed in rational positions with respect to each other to thereby upsize a stroke of a slide table and to improve maintainability.

To achieve the above object, according to the invention, there is provided a linear actuator with a shock-absorbing mechanism, the actuator comprising: a rail base with open opposite ends without end walls standing upward from axial opposite end portions; a guide rail provided in an axial direction on the rail base; a slide table disposed on the rail base to linearly reciprocate along the guide rail; a driving mechanism for driving the slide table; a plurality of shock absorbers disposed in parallel to each other in different positions on the left and right in the slide table with push rods for expanding and contracting projecting outside from opposite end faces of the slide table in a moving direction of the slide table; and a plurality of stoppers which are disposed at the opposite end portions of the rail base to face the respective shock absorbers and with which the respective push rods collide at stroke ends of the slide table.

In the linear actuator of the invention having the above structure, the shock absorbers are mounted to the slide table such that only the push rods project outside from the opposite end faces, it is possible to substantially shorten an entire length of the linear actuator to downsize the actuator and it is possible to upsize an operating stroke as compared with a case in which the entire shock absorbers are mounted to project from the opposite end faces of the slide table. Moreover, because the two shock absorbers are disposed in parallel to each other in the different positions on the left and right in the slide table, the shock absorbers do not conflict with each other for the position and do not obstruct shortening of the slide table unlike a case in which the shock absorbers are disposed coaxially.

Because end walls are not provided to the opposite end portions of the rail base and the opposite ends are open, it is possible to easily discharge dust or the like which has settled on the rail base and the guide rail through the open opposite end portions and maintainability is improved.

In the invention, it is preferable that each the stopper is formed of a support block mounted onto the rail base and a collision face provided to the support block and that a position of at least one of the support block and the collision face is adjustable in the moving direction of the slide table.

According to the invention, there is provided a linear actuator with a shock-absorbing mechanism, the actuator comprising a plurality of shock absorbers mounted to support blocks disposed in different positions on the left and right of the opposite end portions of the rail base with push rods for expanding and contracting oriented in such directions as to face each other and stoppers formed in different positions on the left and right in the slide table and at such distances from opposite end faces of the slide table in a moving direction of the slide table that at least the shock absorbers out of the shock absorbers and the support blocks can enter the slide table, the push rods of the shock absorbers colliding with the stoppers at stroke ends of the slide table.

In a preferred embodiment of the invention, the driving mechanism is detachably mounted to one of side portions of the rail base and has an outside moving member driven to reciprocate in the axial direction of the rail base and the moving member and the slide table are detachably engaged with each other.

The guide rail is provided to a central portion of the rail base and the plurality of shock absorbers and the plurality of stoppers are provided to the slide table and the rail base in positions on opposite sides of the guide rail.

DETAILED DESCRIPTION

Figure 1:
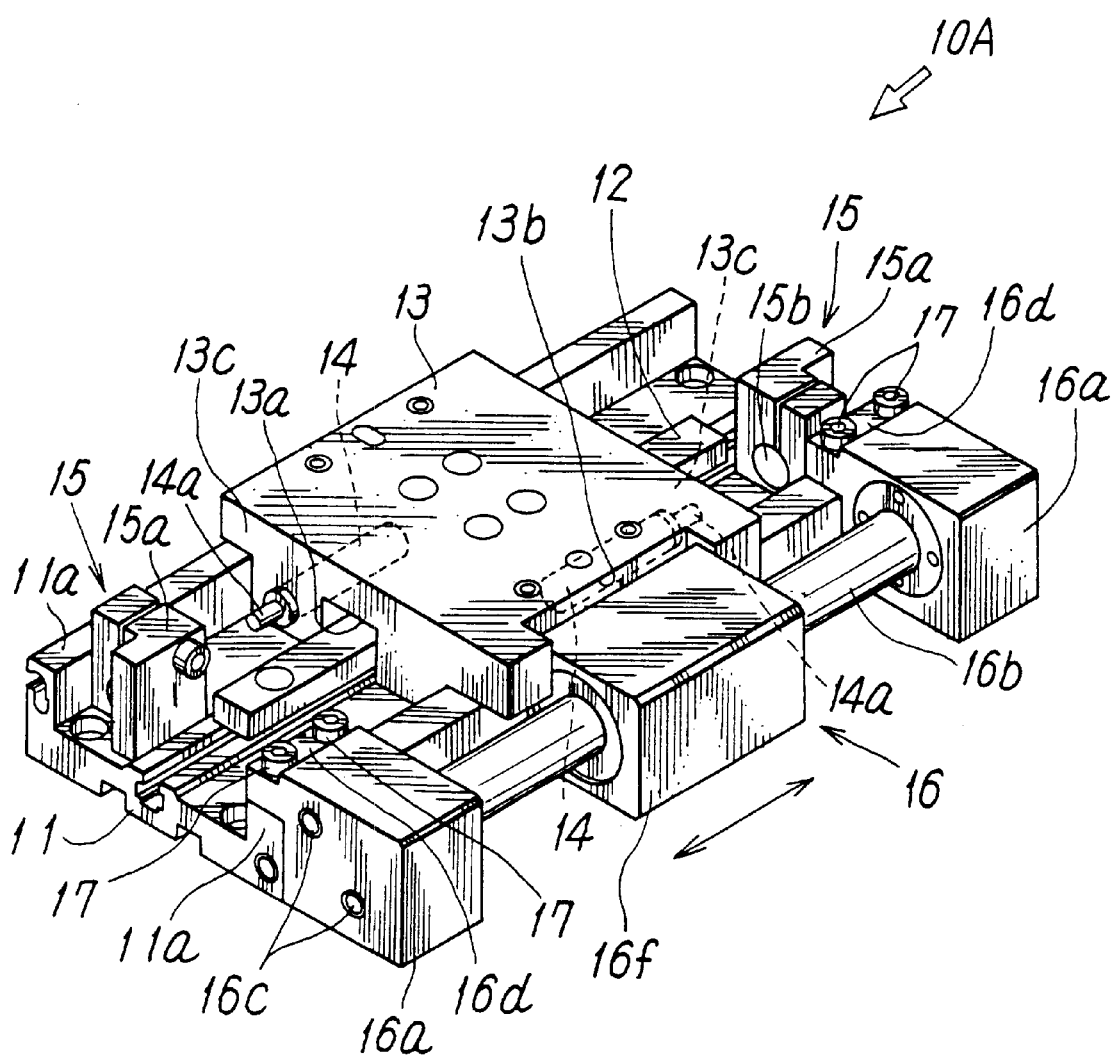
FIG. 1 is a perspective view of a first embodiment of a linear actuator with a shock-absorbing mechanism of the present invention.

Embodiments of the present invention will be described below in detail based on the drawings. In description of the embodiments, components having the same functions are provided with the same reference numerals and described.

Figure 2:
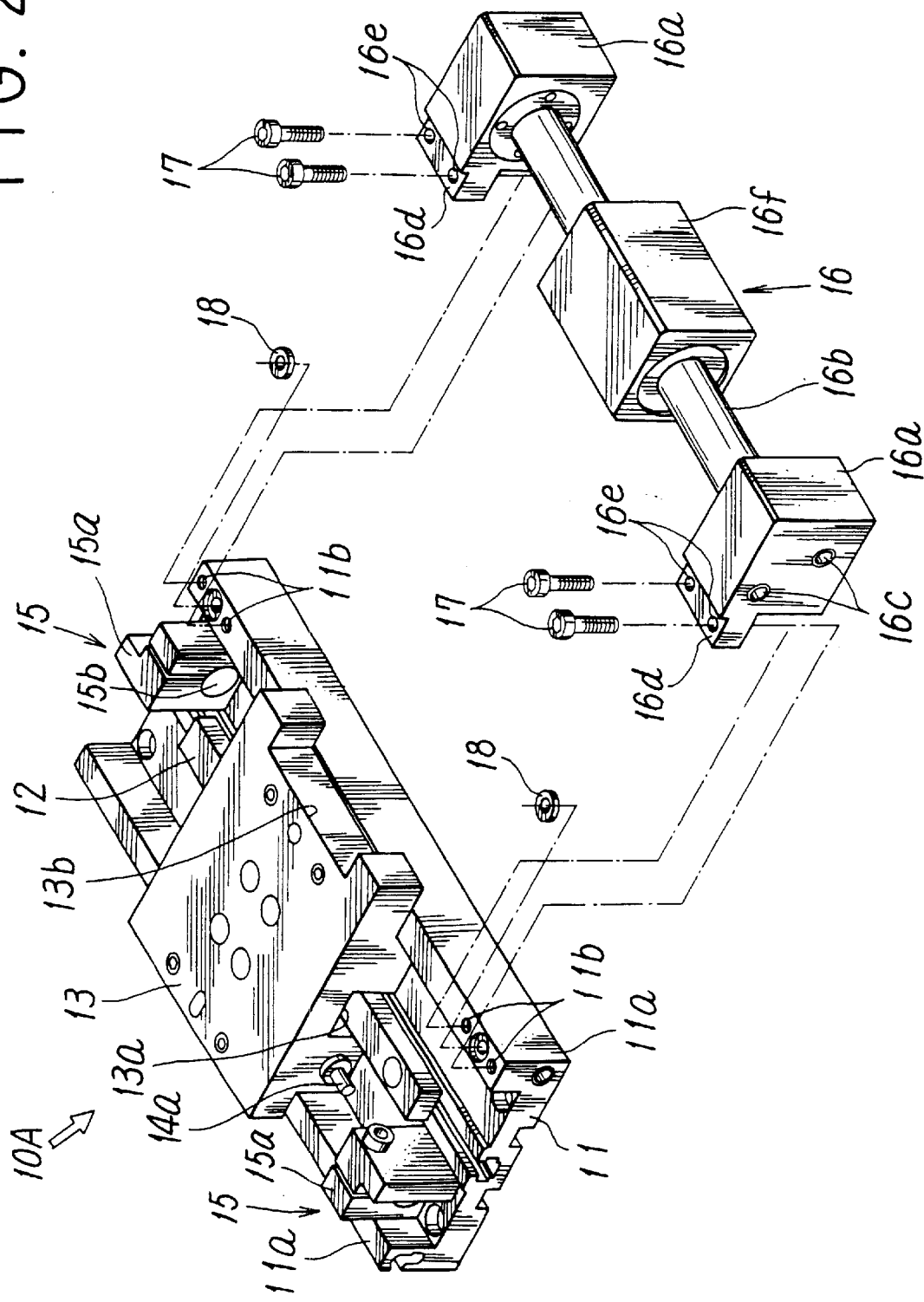
FIG. 2 is a perspective view of a state in which a driving mechanism is detached.

A linear actuator 10A with a shock-absorbing mechanism of a first embodiment shown in FIGS. 1 and 2 has an elongated rail base 11 in a rectangular shape in a plan view. The rail base 11 is in a groove shape and has a pair of side walls 11a, 11a standing upward at an angle of about 90° and extending longitudinally at opposite end portions of the rail base 11 in a width direction. Axial opposite end portions of the rail base 11 are not closed with end walls standing upward and are open.

A guide rail 12 is provided in a position at a substantially central portion between the side walls 11a and 11a of the pair to extend in parallel to the side walls 11a and 11a and a slide table 13 for carrying a workpiece is disposed to be linearly movable along the guide rail 12.

The slide table 13 is disposed such that left and right opposite end portions of the table 13 are placed on the pair of side walls 11a and 11a. The guide rail 12 is fitted for sliding in a recessed portion 13a formed at a central portion of a lower face of the slide table 13. A recessed portion 13b in which an outside moving member 16f of a driving mechanism 16 which will be described later is fitted is formed at one of left and right side end portions of the slide table 13.

Inside the slide table 13, two shock absorbers 14, 14 having push rods 14a for elastically expanding and contracting by operation of a spring, fluid pressure, and the like are disposed in parallel and in orientations opposite to each other in different positions on the left and right of the guide rail 12 with only the push rods 14a projecting outside from opposite end faces 13c and 13c in a moving direction of the slide table 13.

On the other hand, two stoppers 15 and 15 facing the two shock absorbers 14 and 14 are disposed in different positions on the left an right of the guide rail 12 at axial opposite end portions of the rail base 11. Each of the stoppers 15 is formed of a support block 15a mounted to the rail base 11 and a collision face 15b formed at the support block 15a. The push rod 14a of the shock absorber 14 collides with the collision face 15b at each of the stroke ends of the slide table 13, the push rod 14a elastically contracts, and as a result, the slide table 13 stops in a shock-absorbed manner.

Each of the collision faces 15b is formed at a tip end of a shaft rod screwed down into a mounting hole of the support block 15a and a position of the collision face 15b can be adjusted in the moving direction of the slide table by moving the shaft rod forward and rearward to thereby adjust a stroke of the slide table 13. However, it is also possible to make a position of each the support block 15a adjustable without making the position of the collision face 15b adjustable or it is also possible to make positions of both the support block 15a and collision face 15b adjustable.

The driving mechanism 16 is formed of a rodless cylinder in the present embodiment. The rodless cylinder 16 includes two end members 16a and 16a, a cylindrical cylinder tube 16b having opposite ends mounted to the end members 16a and 16a, and the outside moving member 16f mounted for sliding to an outside of the cylinder tube 16b.

A piston (not shown) is housed for sliding in the cylinder tube 16b and is caused to reciprocate in the cylinder tube 16b by fluid pressure supplied alternately to pressure chambers on opposite sides of the piston from ports 16c. The piston and the outside moving member 16f are magnetically coupled by attracting forces of magnets provided to the piston and the member 16f and the outside moving member 16f follows the piston and moves on the cylinder tube 16b. Because the magnetically coupling system is already known, further description will be omitted.

The rodless cylinder 16 is detachably mounted to one of left and right side end portions of the rail base 11 through the two end members 16a and 16a. In other words, a horizontally extending flange portion 16d is formed at one side portion of each the end member 16a and a plurality of mounting holes 16e are formed in the flange portion 16d. On the other hand, a plurality of screw holes 11b are formed at each end portion of an upper face of one side wall 11a of the rail base 11. In a state in which a side end portion of the outside moving member 16f is fitted and engaged in the recessed portion 13b of the slide table 13, the flange portion 16d of each of the end members 16a is brought into contact with the upper face of the side wall 11a of the rail base 11 and a bolt 17 is screwed down and fixed into each the screw hole 11b through the mounting hole 16e.

Thus, the rodless cylinder 16 is mounted to the rail base 11 and is easily detached from the rail base 11 by detaching the bolts 17. A reference numeral 18 in the drawing designates a sealing member for sealing an opening end of a flow path of pressure fluid and formed in the rail base 11.

In the linear actuator 10A having the above structure, if pressure fluid such as compressed air is supplied from the ports 16c into the cylinder tube 16b, the piston in the cylinder tube 16b reciprocates and the outside moving member 16f follows the piston and reciprocates along the cylinder tube 16b. Therefore, the slide table 13 engaged with the outside moving member 16f reciprocates while being guided by the guide rail 12. At each end of a reciprocating stroke of the slide table 13, the push rod 14a of the shock absorber 14 collides with the collision face 15b of the stopper 15, the push rod 14a elastically contracts, and as a result, the slide table 13 stops in a shock-absorbed manner. Therefore, an operating stroke of the slide table 13 is substantially equal to a distance between each of the end faces 13c and each the collision face 15b of the stopper 15.

In the linear actuator 10A, because main body portions of the shock absorbers 14 are housed in the slide table and only the push rods 14a project outside from the opposite end faces 13c and 13c of the slide table 13 in mounting the shock absorbers 14 to the slide table 14, it is possible to substantially shorten an entire length of the linear actuator to downsize the actuator and it is possible to upsize the operating stroke as compared with a case in which the entire shock absorbers are mounted to project from the opposite end faces 13c and 13c of the slide table 13. Moreover, because the two shock absorbers 14 and 14 are disposed in parallel to each other in the different positions on the left and right in the slide table 13, the shock absorbers 14 and 14 do not conflict with each other for the position and do not obstruct shortening of the slide table unlike a case in which the shock absorbers 14 and 14 are disposed coaxially. Because it is also possible to dispose the main body portions of the two shock absorbers 14 and 14 side by side in the same positions on the left and right if necessary, it is possible to shorten the slide table 13 to the limit according to a use.

Because end walls are not provided to the opposite end portions of the rail base 11 and the opposite ends are open, the stoppers 15 can be disposed near the opposite end portions of the rail base 11 and it is possible to shorten an entire length of the rail base 11 to the limit. Moreover, it is possible to easily discharge dust or the like which has settled on the rail base 11 and the guide rail 12 through the open opposite end portions and maintainability is improved.

Figure 3:
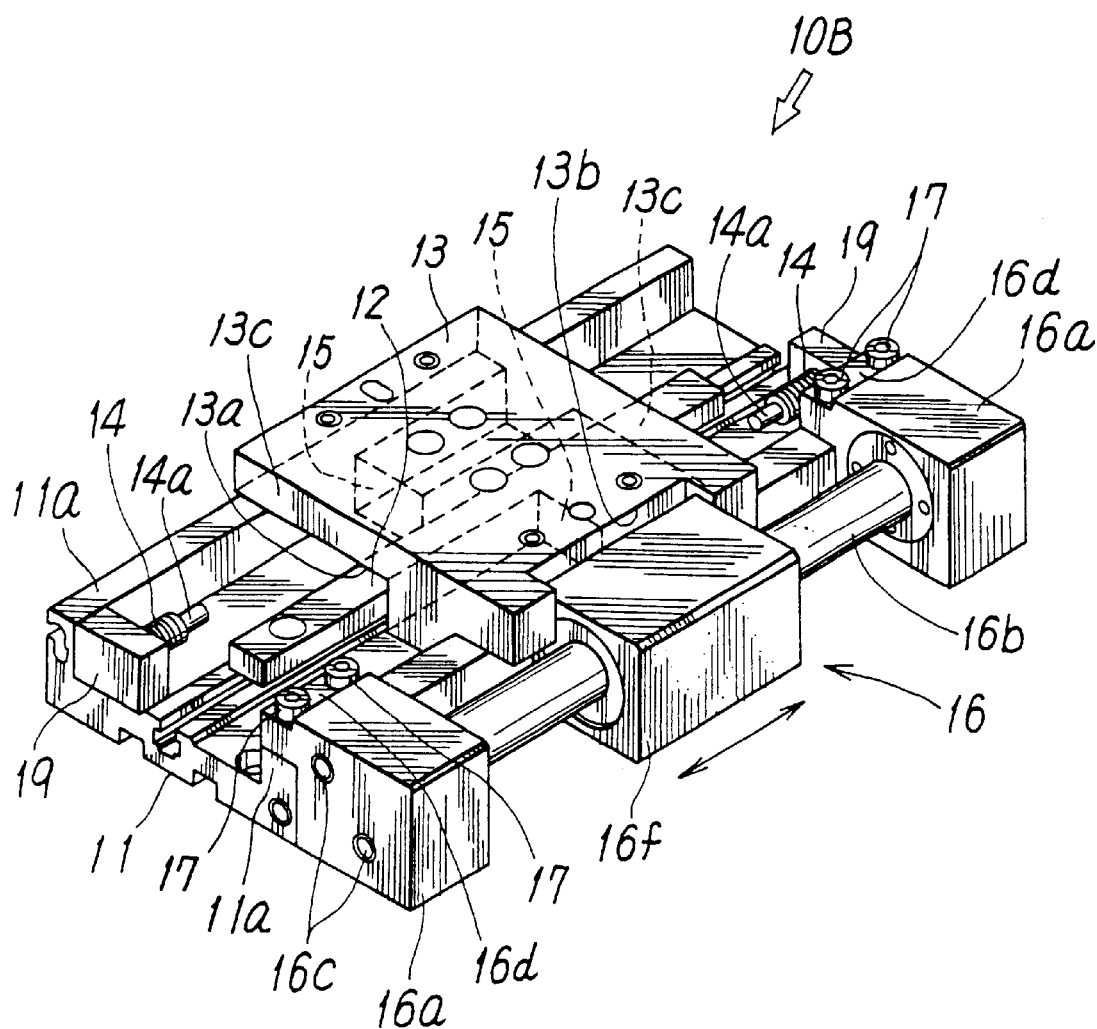
FIG. 3 is a perspective view of a second embodiment of the linear actuator with the shock-absorbing mechanism of the invention.
Figure 4:
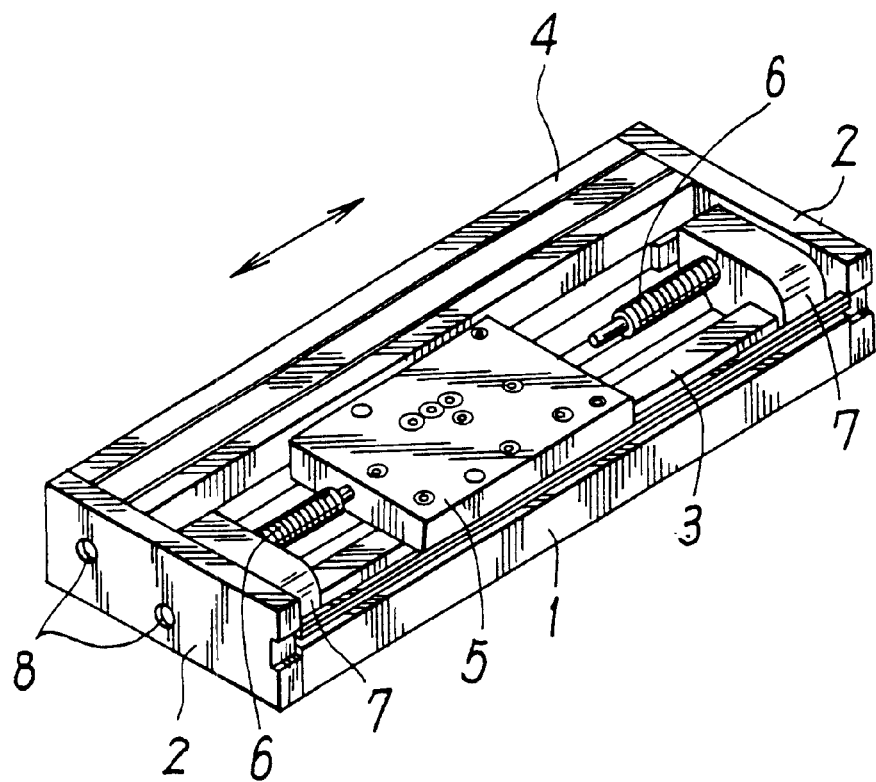
FIG. 4 is a perspective view of a prior-art linear actuator.

FIG. 3 shows a second embodiment of the linear actuator of the invention. The linear actuator 10B of the second embodiment is different from the first embodiment in that the shock absorbers 14 are provided to the rail base 11 and the stoppers 15 are provided to the slide table 13.

In other words, support blocks 19 and 19 are mounted in different positions on the left and right at the opposite end portions of the rail base 11 and the shock absorbers 14 are respectively mounted in parallel to each other to the support blocks 19 and 19 with the push rods 14a facing the slide table 13.

On the other hand, the stoppers 15 and 15 with which the push rods 14a and 14a of the shock absorbers 14 and 14 collide are formed in different positions on the left and right in the slide table 13 such that the stoppers 15 and 15 extend inside from the opposite end faces 13c and 13c by certain distances. A space portion between each the stopper 15 and each the end face 13c of the slide table 13 has such a length that at least the shock absorber 14 out of the shock absorber 14 and the support block 19 can enter the space portion at the stroke end of the slide table 13.

It is preferable that at least one of positions of the support block 19 and the shock absorber 14 is adjustable in an axial direction of the rail base 11.

Because structures and functions of the second embodiment other than those described above are substantially similar to those of the linear actuator of the first embodiment shown in FIG. 1, reference numerals similar to those of the first embodiment are provided to the similar components to omit description of them.

Although the two shock absorbers 14 and the two stoppers 15 are provided in the respective embodiments, it is also possible to provide three or more shock absorbers and stoppers.

Although the driving mechanism 16 shown in the respective embodiments is formed of the rodless cylinder and the piston and the outside moving member 16f are magnetically coupled by magnets, a method of coupling the piston and the outside moving member 16f is not limited to the magnetic coupling and the piston and the outside moving member 16f may be coupled mechanically. Instead of forming the driving mechanism 16 by using the rodless cylinder of a fluid pressure type, it is also possible to form the driving mechanism by using an electric actuator in which the outside moving member 16f is screwed onto a screw rod rotated by a motor and the outside moving member 16f is caused to reciprocate by rotating the screw rod.

What is claimed is:

1. A linear actuator with a shock-absorbing mechanism, said actuator comprising:

a rail base with open opposite ends without end walls standing upward from axial opposite end portions;

a guide rail provided in an axial direction on said rail base;

a slide table disposed on said rail base to linearly reciprocate along said guide rail;

a driving mechanism for driving said slide table;

a plurality of shock absorbers disposed in parallel to each other in different positions on the left and right in said slide table with push rods for expanding and contracting projecting outside from opposite end faces of said slide table in a moving direction of said slide table; and a plurality of stoppers which are disposed at said opposite end portions of said rail base to face said respective shock absorbers and with which said respective push rods collide at stroke ends of said slide table.

2. A linear actuator according to claim 1, wherein each of said stoppers is formed of a support block mounted onto said rail base and a collision face provided to said support block and a position of at least one of said support block and said collision face is adjustable in said moving direction of said slide table.

3. A linear actuator according to claim 1, wherein said driving mechanism is detachably mounted to one of side portions of said rail base and has an outside moving member driven to reciprocate in said axial direction of said rail base and said moving member and said slide table are detachably engaged with each other.

4. A linear actuator according to claim 1, wherein said guide rail is provided to a central portion of said rail base and said plurality of shock absorbers and said plurality of stoppers are provided to said slide table and said rail base in positions on opposite sides of said guide rail.

5. A linear actuator according to claim 4, wherein said driving mechanism is detachably mounted to one of side portions of said rail base and has an outside moving member driven to reciprocate in said axial direction of said rail base and said moving member and said slide table are detachably engaged with each other.

6. A linear actuator according to claim 4, wherein said guide rail is provided to a central portion of said rail base and said plurality of shock absorbers and said plurality of stoppers are provided to said slide table and said rail base in positions on opposite sides of said guide rail.

7. A linear actuator with a shock-absorbing mechanism, said actuator comprising:

a rail base with open opposite ends without end walls standing upward from axial opposite end portions;

a guide rail provided in an axial direction on said rail base;

a slide table disposed on said rail base to linearly reciprocate along said guide rail;

a driving mechanism for driving said slide table;

a plurality of shock absorbers mounted to support blocks disposed in different positions on the left and right of said opposite end portions of said rail base with push rods for expanding and contracting oriented in such directions as to face each other; and stoppers formed in different positions on the left and right in said slide table and at such distances from opposite end faces of said slide table in a moving direction of said slide table that at least said shock absorbers out of said shock absorbers and said support blocks can enter said slide table, said push rods of said shock absorbers colliding with said stoppers at stroke ends of said slide table.

* * * * *